US006567456B1

(12) United States Patent
Sandberg

(10) Patent No.: US 6,567,456 B1
(45) Date of Patent: May 20, 2003

(54) METHOD AND APPARATUS FOR ACHIEVING POLARIZATION IN A LASER USING A DUAL-MIRROR MIRROR MOUNT

(75) Inventor: Jon C. Sandberg, Boulder, CO (US)

(73) Assignee: Research Electro-Optics, Inc., Boulder, CO (US)

( * ) Notice: Subject to any disclaimer, the term of this patent is extended or adjusted under 35 U.S.C. 154(b) by 0 days.

(21) Appl. No.: 09/379,299

(22) Filed: Aug. 23, 1999

(51) Int. Cl.[7] ................................................ H01S 3/08
(52) U.S. Cl. ............................ 372/107; 372/65; 372/99
(58) Field of Search ............................. 372/92, 99, 107, 372/65, 108

(56) References Cited

U.S. PATENT DOCUMENTS 3,940,712 A * 2/1976 White ........................ 372/93
4,679,204 A * 7/1987 Koseki ...................... 372/107
4,876,690 A * 10/1989 Nishida et al. ............... 372/61
6,026,112 A * 2/2000 Hecht et al. .................. 372/99

* cited by examiner

Primary Examiner—Leon Scott, Jr.
(74) Attorney, Agent, or Firm—The Law Offices of Jessica Costa, PC; Jessica Costa

(57) ABSTRACT

A novel dual-mirror mirror mount assembly for achieving polarization of a light beam in a gaseous laser is presented. The assembly includes a mirror mount structure open at one end and having a hollow cavity therein. A pair of mirrors are hard-sealed to the mirror mount structure. The first mirror is partially reflective and the second mirror is maximally reflective. The second mirror is arranged at a predetermined angle N with respect to the first mirror such that a light beam entering said mirror mount structure follows a beam path hitting the first mirror, reflecting off the first mirror and hitting the second mirror, and then retro-reflecting back on itself along the beam path of the entering light beam. The polarization function of a Brewster window is thus achieved without the use of an intra-cavity Brewster window.

21 Claims, 2 Drawing Sheets

METHOD AND APPARATUS FOR ACHIEVING POLARIZATION IN A LASER USING A DUAL-MIRROR MIRROR MOUNT

FIELD OF THE INVENTION

The present invention pertains generally to laser devices, and more particularly, to a novel dual-mirror mirror mount for polarizing light emitted from a laser without the use of an intra-cavity Brewster window.

BACKGROUND OF THE INVENTION

As increased applications of lasers are found due to the unique high-energy, high-precision properties of the output beam from such devices, the use of lasers throughout many areas of technology is becoming increasingly ubiquitous. As known by those skilled in the art, a laser is a very high frequency optical oscillator constructed from an amplifier and an appropriate amount of positive feedback. Lasers are used as critical components in a number of industries, including optical telecommunications, medical surgery, and manufacturing.

A typical gas laser comprises a plasma tubule discharge chamber enclosing a gaseous medium. An arc discharge is established through the gaseous medium, which serves to ionize the gas, thereby forming a plasma and elevating the electron energy states to the level required for lasing action. As the electrons recombine to lower energy states, light is emitted via spontaneous emission. Typically, a pair of optical resonator mirrors seal the two ends of the plasma tube so that light emitted by the plasma oscillates between the optical resonator mirrors and is amplified as it passes through the gaseous medium to achieve a lasing action in a manner known by those skilled in the art.

In a simple gaseous laser plasma discharge chamber with a cylindrical symmetry, the light output from the laser is randomly polarized. Each individual cavity mode has a linear polarization at any one time. However, the overall laser output is a time-varying mix of modes of different polarization. As a result, the output beam appears to be non-polarized when integrated over a fairly short period of time. Although the beam intensity is fairly constant, if the application involves polarization-dependent optics, then a polarizing intra-cavity Brewster window is employed which introduces sufficient loss in the plane of s-polarization (defined by the mode whose polarization vector for the electric field is perpendicular to the plane of incidence) so that only p-polarized output (defined by the mode whose polarization vector for the electric field is parallel to the plane of incidence) is produced. This occurs when the Brewster window is positioned at a Brewster's angle defined as:

$$2(b)=\arctan(n)$$

where n is the index of refraction of the window material and the index of refraction on either side of the window is assumed to be exactly 1. The Brewster window acts as a partial polarizer that ensures partial reflectivity for S-polarization and nominally zero reflectivity for p-polarization. Thus, the Brewster window provides maximum transmission efficiency at a preferred orientation for the polarization within the laser. The use of Brewster angle window assemblies is a standard technique that has been in use for many years, and, prior to the present invention, was the standard polarization method in commercial use for gas lasers. Polarization in gaseous lasers is described in greater detail in "Lasers and Electro-Optics: Fundamentals and Engineering" by Christopher C. Davis, Cambridge University Press, 1996 (ISBN 0-521-30831-3), which is incorporated herein by reference for all that it teaches.

To facilitate a better understanding of the advantages conferred by the present invention, a brief description of a conventional helium-neon laser 10 will be first described in conjunction with FIG. 1. As illustrated, laser 10 includes a coaxial gas discharge chamber 12 defining a first end 2 and a second end 4 at opposite ends of the coaxial axis. Discharge chamber 12 comprises a concentric capillary bore 18 located coaxially therein. Typically, a support web 20 provides support to ensure centralization and better rotational stability of the capillary bore 18. A cylindrical cathode 16 is positioned coaxially within the first end 2 of the discharge chamber 12.

A first mirror mount assembly 40 is hard sealed to the first end 2. First mirror mount assembly 40 includes a steel mirror mount 42 brazed to end plate 38. A mirror substrate 44 is coated with a mirror coating 46 and hard-sealed to a mirror cup formed in the mirror mount 42 using a pre-formed glass frit 48. End plate 38 is sealed to the first end 2 of discharge chamber 12 via a glass-to-metal seal 34.

A second mirror mount assembly 50 is hard sealed to the second end 4 of discharge chamber 12. Second mirror mount assembly 50 includes a steel mirror mount 52 brazed to end plate 68. A mirror substrate 54 is coated with a mirror coating 56 and hard-sealed to a mirror cup formed in the mirror mount 52 using a pre-formed glass frit 58. In the illustrative embodiment, second mirror mount assembly 50 includes an optional polarizing Brewster window 66. Brewster window is positioned within the internal chamber of the mirror mount 42 and arranged at a Brewster angle with respect to coaxial axis of the capillary bore 18. End plate 68 is sealed to the second end 4 of discharge chamber 12 formed by the glass capillary bore 18 via a glass-to-metal seal 64.

The electrical anode 14 of the laser in this embodiment is formed by the steel mirror mount 58. Electrical contacts to the cathode 16 are provided by support bonding straps 36 bonded to the cathode 16 and to the end plate 38. In an illustrative 2 mW design, the resonator defined by the two mirrors 46 and 56 and the capillary bore 18 is typically of a hemispherical design with the bore diameter being 1.5 mm, mirror 54 being a flat mirror, and mirror 44 being a 30 cm concave mirror. The 30 cm concave mirror 44 is the output coupler which has a convex output radius to collimate the exiting radiation. Typical reflectivity for the high reflector is 99.9+%, while the output coupler 44 has a nominal 1% transmission.

An arc discharge is established by applying a voltage from a power supply (not shown) across the anode 14 and cathode 16. The arc discharge causes the gasses within the discharge chamber 12 to be ionized, forming a plasma thereby. As the ions decay to lower energy states, light radiation is emitted in a manner well-known to those skilled in the art, and amplified by the optical resonator formed by mirrors 44, 54 and capillary bore 18 such that a lasing action occurs.

The current prior art configuration of a polarizing Brewster window mirror mount assembly as exemplified by mirror mount assembly 50 of the gas laser 10 shown in FIG. 1 is problematic. Because the Brewster window 66 is configured to reside within the mirror mount, manufacture of the mirror mount 50 is difficult because of the need to clean both sides of the window 66 during manufacture, the need to precisely position the window 66 at the Brewster's angle in order to prevent loss in efficiency (i.e., reduced power output) of the laser from deviation from the Brewster's angle, and the care required to mount the window in order to avoid stressing the window.

Accordingly, a need exists for a new and improved technique for polarizing a laser beam without the use of an internal Brewster angle window integrated into the mirror mount.

SUMMARY OF THE INVENTION

The present invention is a novel method and apparatus for polarizing a laser beam without the use of a mirror mount with an internal integral Brewster window. In accordance with the method and apparatus of the invention, the present invention eliminates the Brewster window altogether and integrates two mirrors, one preferably at approximately 45° with respect to the other, along the exterior of the mirror mount structure. The mirror mount structure is open at one end and has a hollow cavity therein. A pair of mirrors are hard-sealed to the mirror mount structure. The first mirror is partially reflective and the second mirror is maximally reflective. The second mirror is arranged at a predetermined angle N with respect to the first mirror such that a light beam entering said mirror mount structure follows a beam path hitting the first mirror, reflecting off the first mirror and hitting the second mirror, and then retro-reflecting back on itself along the beam path of the entering light beam.

Because polarization is achieved using external mirrors rather than an integral internal mirror mounted within the mirror mount chamber, the mirror mount assembly of the invention is easier to manufacture, thereby resulting in higher manufacturing yields. Furthermore, since the polarization is achieved without employing an internal Brewster window, the cleaning issues associated with the internal window are eliminated. In addition, the angle of the mirrors is adjustable by bending the entire mirror mount as a unit. This simplifies angle adjustment and reduces the amount of accuracy required for setting the angle during manufacturer, thereby reducing complexity and cost of manufacture, and increasing the transmission efficiency due to the ability to achieve lower intracavity loss.

BRIEF DESCRIPTION OF THE DRAWING

The invention will be better understood from a reading of the following detailed description taken in conjunction with the drawing in which like reference designators are used to designate like elements, and in which.

DETAILED DESCRIPTION

A novel technique and system that facilitates polarization of light emitted in a gaseous laser using a novel dual-mirror mirror mount assembly is described in detail hereinafter. The invention is described within the context of gaseous helium-neon lasers by way of example only and not limitation. The principles of the invention may be applied to any laser system requiring a polarizing mirror mount assembly.

Figure 2A:
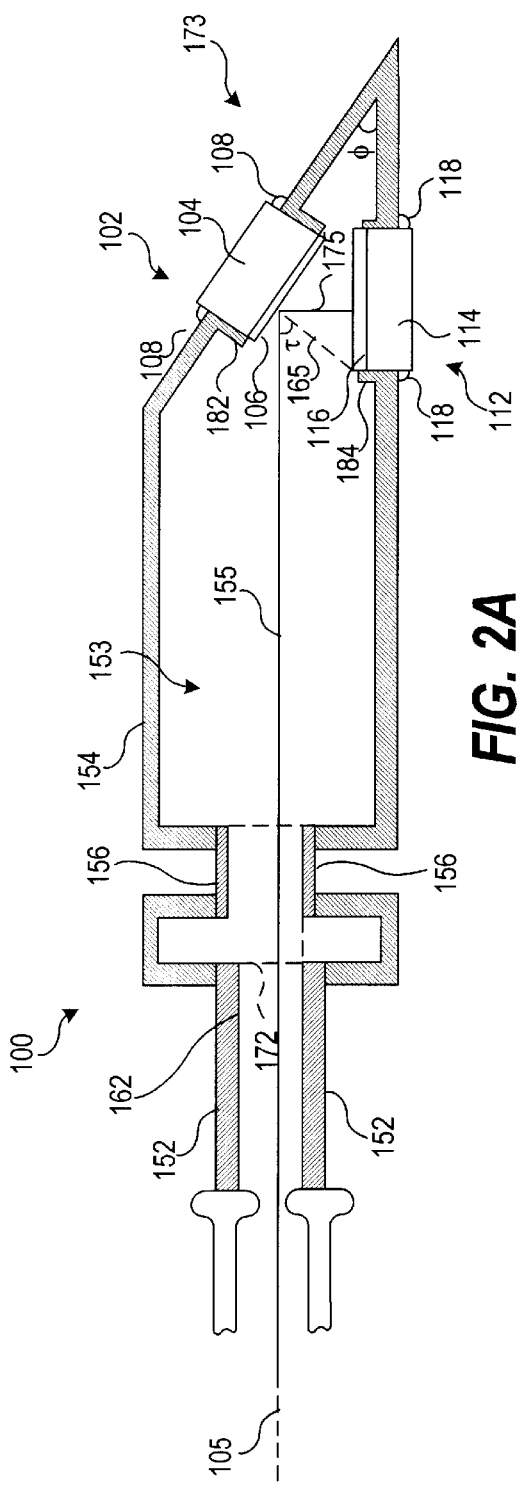
FIG. 2A is a cross-sectional view of a mirror mount assembly implemented in accordance with the invention.

Turning now to the novel features and results accompanying the present invention, there is shown in FIG. 2A a coaxial cross-sectional view of a mirror mount assembly 100 implemented in accordance with the invention. Assembly 100 comprises a mirror mount structure 154 forming a chamber 153 therein that is open at a first end 172 and hard sealed at in proximity to a second end 173 by a pair of mirrors 102 and 112. Mirrors 102 and 112 are arranged at a predetermined acute angle $\phi$ with respect to one another. Angle $\phi$ is set such that the light beam emitted from the discharge chamber of the laser to which the mirror mount assembly 100 is attached retro-reflects back on itself along the beam path of the beam entering the mirror mount structure 154. In the preferred embodiment, angle $\phi$ is 45°. In this embodiment, the beam 155 enters the mirror mount structure 154 and hits mirror 102 at an angle of incidence of approximately 45° with respect to the normal 165 of mirror 102. Mirror 102 reflects the beam 155 symmetrically around the normal 165 of mirror 102 such that beam 155 hits mirror 112 at an angle substantially equal to the normal 175 of mirror 112. Accordingly, mirror 112 reflects beam 155 back on itself such that the exit path of the beam 155 is the identical reverse of the entrance path of the beam.

Figure 2B:
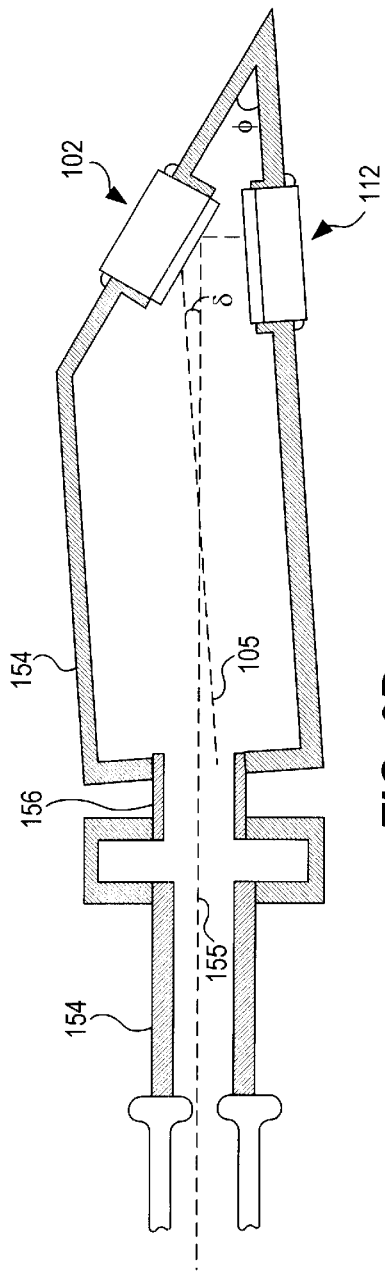
FIG. 2B is a cross-sectional view of a mirror mount assembly implemented in accordance with the invention that has been adjusted for maximum transmission efficiency.

In the preferred embodiment, the chamber of 153 mirror mount structure 154 is cylindrical along the coaxial axis 105 with respect to the open end 172 of the structure 154. The sealed end 173 of the structure 154 comprises a pair of mirror cups 182 and 184 in which respective mirrors 102 and 112 are hard-sealed using glass frits 108 and 118 respectively. Mirror 102 preferably comprises a substrate 104 coated with a mirror coating 106 such that it provides the maximum reflectivity for s-polarization and partial reflectivity (e.g., 97% to 98%) for p-polarization. Likewise, mirror 112 preferably comprises a substrate 114 coated with a mirror coating 116, and is substantially 99.9+% reflective such that it provides maximum reflectivity. Structure 154 is preferably made of stainless steel such as 4750 steel, which matches the coefficient of expansion of the mirror substrates 104, 114 and glass frits 108, 118 of the mirror seals. In a preferred embodiment, mirror mount structure 154 also forms a bendable thin-walled section 156 which allows the mirror mount assembly 100 to be adjusted as a unit to adjust the angle of incidence of the light beam 155. This is an improvement over the prior art Brewster window adjustment techniques for maximizing transmission efficiency. Adjustment of the angle of the mirrors is simplified and achieved by adjusting the angle of the entire mirror mount 100. FIG. 2B illustrates the mirror mount assembly 100 when adjusted by angle $\delta$ relative to the center axis 105 of the mirror mount structure 154. As shown, light beam 155a enters mirror mount structure 154 and hits mirror 102 at angle $\delta$ with respect to the center axis 105 of the laser 200. Mirror 102 performs partial polarization and substantially reflects beam 155 at an angle normal to axis 125. Light beam 155 hits mirror 112, which totally reflects the beam 155 back on itself to mirror 102 at the angle normal to axis 125. Mirror 102 reflects the returned beam back along the path it entered at angle $\delta$ with respect to the center axis 105. Accordingly, the partial polarization function typically performed by Brewster window or external Brewster window angle adjustment clamps as was done in the prior art.

Mirror mount assembly 100 also preferably includes a cylindrical steel end plate 152 having a hollow cylindrical cavity therein that is open at both ends of the coaxial axis of the cylinder. One open end of end plate 152 is brazed to the first end 172 of the mirror mount structure 154, while the opposite open end of end plate 152 is hard-sealable to one end 204 of a laser 200.

Figure 1:
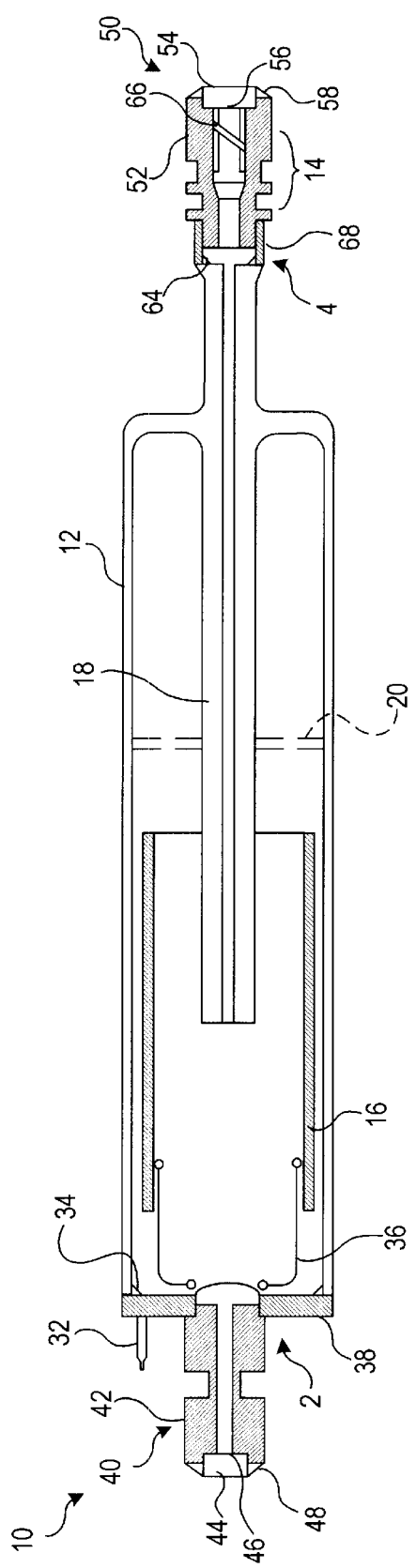
FIG. 1 is a cross-section view of a conventional gaseous laser.
Figure 3:
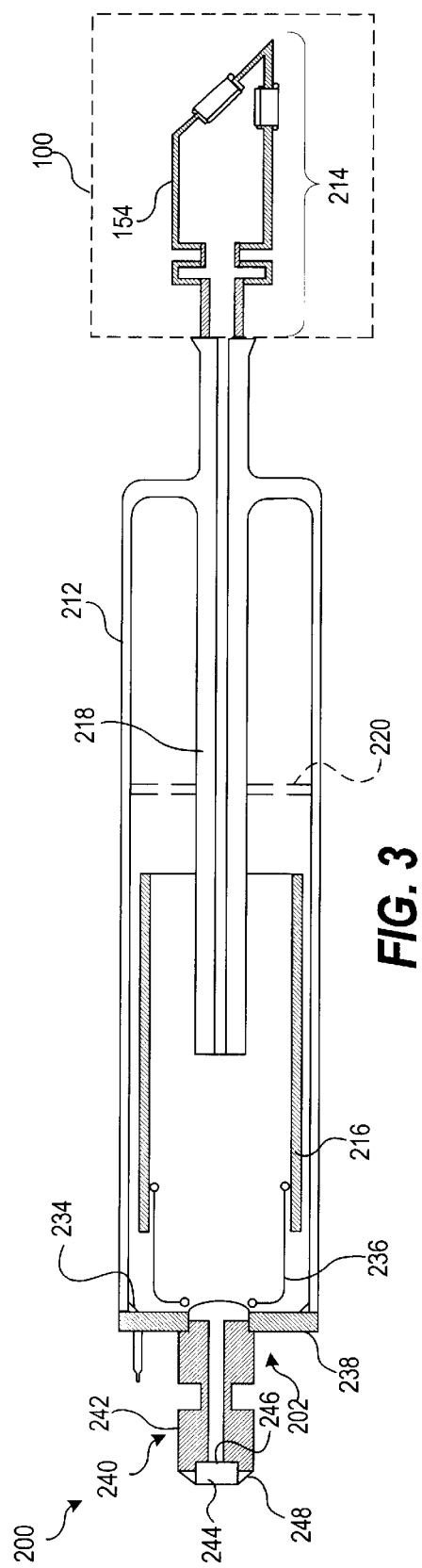
FIG. 3 is a cross-section view of a gaseous laser implemented in accordance with the invention.

FIG. 3 is a cross-sectional view of a laser 200 employing the dual-mirror mirror mount 100 of the invention. As illustrated, laser 200 is identical to laser 10 of FIG. 1 except that mirror mount 50 in FIG. 1 is replaced with the dual-mirror mirror mount assembly of 100 of the invention in FIG. 3. In particular, laser 200 includes a coaxial gas discharge chamber 212 defining a first end 202 and a second end 204 at opposite ends of the coaxial axis 125. Discharge chamber 212 comprises a concentric capillary bore 218 located coaxially therein with a support web 220. Cylindrical cathode 216 is positioned coaxially within the first end 202 of the discharge chamber 12.

A first mirror mount assembly 240 is hard sealed to the first end 202. Assembly 240 includes a steel mirror mount 242 brazed to end plate 238. A mirror substrate 244 is coated with a mirror coating 246 and hard-sealed to a mirror cup formed in the mirror mount 242 using a pre-formed glass frit 248. End plate 238 is sealed to the first end 202 of discharge chamber 212 via a glass-to-metal seal 234. First mirror 244, 246 is the output coupler which has a reflectivity of 99.9+%, and a nominal 1% transmission.

In the preferred embodiment, the steel mirror mount 242 is made of 4750 steel, the end plate 238 is made of Kovar, and the mirror substrate 244 and glass frit 248 are made of BK-7 glass. The Kovar provides the proper expansion match for glass-to-metal sealing of the body parts, while the 4750 steel is matched to BK-7 glass used as a substrate material. Accordingly, all three materials have matched expansion coefficients.

Mirror mount assembly 100 is hard sealed to the second end 204 of discharge chamber 212. Mirror mount assembly 100 is described in detail with respect to FIGS. 2A and 2B.

The electrical anode 214 of the laser is formed by the steel mirror mount structure 154. Electrical contacts to the cathode 216 are provided by support bonding straps 236 bonded to the cathode 216 and to the end plate 238. An arc discharge is established by applying a voltage from a power supply (not shown) across the anode 214 and cathode 216. The arc discharge causes ionization of the gas, forming a plasma thereby. As the ions decay to lower energy states, light radiation is emitted and amplified by the optical resonator, resulting in lasing action.

In order to achieve the proper p-polarization in a laser implemented in accordance with the present invention, the amount of transmission that the angled mirror 112 has must have a transmission that is comparable to that of the output coupler, in this case the mirror 244, 246 in first mirror mount 240. Accordingly, in the illustrative embodiment, the transmission of angled mirror 112 is approximately 1%, but can be as low as 0.1% or as high as 2- to 3% or higher depending on the output coupler design for the laser.

A novel technique and system that facilitates polarization of a light beam in a gaseous laser using a novel dual-mirror mirror mount has been described in detail above. It will be appreciated from a reading of the description that the present invention provides advantages over the prior art that were previously unattainable. In particular, because the mirror mount is constructed by mounting two mirrors on the walls of the mirror mount structure rather than by forming a Brewster window integral and internal to the structure chamber, manufacture of the mirror mount is significantly simplified. In addition, the elimination of the internal Brewster window within the cavity of the mirror mount allows for easier cleaning. Additionally, the elimination of the internal Brewster window reduces the number of parts, and simplifies the components necessary to adjust the angle of polarization. In particular, the dual-mirror mirror mount of the invention eliminates the need for any Brewster window adjustment clips, and allows for angle adjustment by simply adjusting the angle of the mirror mount as a single unit.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

What is claimed is:

1. A dual-mirror mirror mount assembly, comprising:

a mirror mount structure having a first end and a second end and having a chamber formed therebetween, said mirror mount structure capable of receiving coherent light through said first end, said received coherent light traveling in a direction towards said second end along a plane of incidence through said chamber;

a first mirror mounted on a first wall of said mirror mount structure near said second end at a first angle with respect to said plane of incidence in order to reflect said received coherent light along a plane of reflection;

a second mirror mounted on a second wall of said mirror mount structure near said second end and arranged at a second angle normal to said plane of reflection in order to reflect said coherent light reflected by said first mirror back to said first mirror at an angle normal to said second mirror such that said first mirror reflects said coherent light out said first end of said structure along said plane of incidence.

2. A dual-mirror mirror mount assembly in accordance with claim 1, wherein:

said first mirror is partially-reflective and said second mirror is maximally reflective.

3. A dual-mirror mirror mount assembly in accordance with any one of claims 1 or 2, wherein:

said second mirror is substantially parallel to said plane of incidence.

4. A dual-mirror mirror mount assembly in accordance with any one of claims 1, 2, or 3, wherein:

said first mirror reflects said light beam substantially along the normal of said plane of incidence.

5. A dual-mirror mirror mount assembly in accordance with any one of claims 1, 2, 3, or 4, wherein:

said mirror mount structure comprises a bendable section to allow said chamber to be rotated in order to adjust said first angle with respect to said plane of incidence. to a state of inverted population;

6. A dual-mirror mirror mount assembly in accordance with any one of claims 1, 2, 3, 4, or 5, wherein:

said first mirror provides maximum reflectivity for s-polarization and partial reflectivity for p-polarization.

7. A dual-mirror mirror mount assembly in accordance with any one of claims 1, 2, 3, 4, 5, or 6, wherein:

said first angle comprises a Brewster's angle between said first mirror and plane of incidence.

8. A laser, comprising:

an active medium comprising a collection of atoms/molecules that can be excited to a state of inverted population;

a feedback mirror at a first end of said active medium;

an excitation mechanism comprising a source of energy that excites said atoms/molecules of said active medium to create population inversion resulting in a beam of coherent light traveling along a plane of incidence perpendicular to said feedback mirror towards a second end of said active medium; and a mirror assembly at said second end of said active medium, said mirror mount assembly comprising:

a mirror mount structure having a first end and a second end and having a chamber formed therebetween, said mirror mount structure capable of receiving said coherent light through said first end of said mirror mount structure, said received coherent light traveling in a direction towards said second end of said mirror mount structure along said plane of incidence through said chamber;

a first mirror mounted on a first wall of said mirror mount structure near said second end at a first angle with respect to said plane of incidence in order to reflect said received coherent light along a plane of reflection;

a second mirror mounted on a second wall of said mirror mount structure near said second end of said mirror mount structure and arranged at a second angle normal to said plane of reflection in order to reflect said coherent light reflected by said first mirror back to said first mirror at an angle normal to said second mirror such that said first mirror reflects said coherent light out said first end of said structure along said plane of incidence.

9. A laser in accordance with claim 8, wherein:

said first mirror is partially-reflective and said second mirror is maximally reflective.

10. A laser in accordance with any one of claims 8 or 9, wherein:

said second mirror is substantially parallel to said plane of incidence.

11. A laser in accordance with any one of claims 8, 9 or 10, wherein:

said first mirror reflects said light beam substantially along the normal of said plane of incidence.

12. A laser in accordance with any one of claims 8, 9, 10 or 11, wherein:

said mirror mount structure comprises a bendable section to allow said chamber to be rotated in order to adjust said first angle with respect to said plane of incidence.

13. A laser in accordance with any one of claims 8, 9, 10, 11, or 12, wherein:

said first mirror provides maximum reflectivity for s-polarization and partial reflectivity for p-polarization.

14. A laser in accordance with any one of claims 8, 9, 10, 11, 12, or 13, wherein:

said first angle comprises a Brewster's angle between said first mirror and plane of incidence.

15. A method for constructing a dual-mirror mirror mount assembly, said assembly comprising a mirror mount structure having a first end and a second end and having a chamber formed therebetween, said mirror mount structure capable of receiving coherent light through said first end, said received coherent light traveling in a direction towards said second end along a plane of incidence through said chamber, said method comprising:

mounting a first mirror on a first wall of said mirror mount structure near said second end at a first angle with respect to said plane of incidence in order to reflect said received coherent light along a plane of reflection;

mounting a second mirror on a second wall of said mirror mount structure near said second end and arranged at a second angle normal to said plane of reflection in order to reflect said coherent light reflected by said first mirror back to said first mirror at an angle normal to said second mirror such that said first mirror reflects said coherent light out said first end of said structure along said plane of incidence.

16. A method in accordance with claim 15, wherein:

said first mirror is partially-reflective and said second mirror is maximally reflective.

17. A method in accordance with any one of claims 15 or 16, wherein:

said second mirror is substantially parallel to said plane of incidence.

18. A method in accordance with any one of claims 15, 16, or 17, wherein:

said first mirror reflects said light beam substantially along the normal of said plane of incidence.

19. A method in accordance with any one of claims 15, 16, 17, or 18, wherein:

said mirror mount structure comprises a bendable section to allow said chamber to be rotated in order to adjust said first angle with respect to said plane of incidence.

20. A method in accordance with any one of claims 15, 16, 17, 18, or 19, wherein:

said first mirror provides maximum reflectivity for s-polarization and partial reflectivity for p-polarization.

21. A method in accordance with any one of claims 15, 16, 17, 18, 19, or 20, wherein:

said first angle comprises a Brewster's angle between said first mirror and plane of incidence.

* * * * *